(12) United States Patent
Daudin et al.

(10) Patent No.: US 9,198,151 B2
(45) Date of Patent: Nov. 24, 2015

(54) UMA/GAN KEEP-ALIVE MECHANISIM IN WIRELESS COMMUNICATION NETWORKS

(75) Inventors: Guillaume Daudin, Midi Pyrennees (FR); Frederic Bon, Lavernose (FR); Fabienne Lefevre, Villeneuve Tolosane (FR)

(73) Assignee: Google Technology Holdings LLC, Mountain View, CA (US)

( * ) Notice: Subject to any disclaimer, the term of this patent is extended or adjusted under 35 U.S.C. 154(b) by 1856 days.

(21) Appl. No.: 12/369,148

(22) Filed: Feb. 11, 2009

(65) Prior Publication Data

US 2009/0201857 A1  Aug. 13, 2009

(30) Foreign Application Priority Data

Feb. 11, 2008  (EP) .................................... 08305020

(51) Int. Cl.
| | |
|---|---|
| *H04W 52/00* | (2009.01) |
| *H04W 60/02* | (2009.01) |
| *H04L 29/06* | (2006.01) |
| *H04L 29/08* | (2006.01) |
| *H04W 80/06* | (2009.01) |

(52) U.S. Cl.
CPC ............... *H04W 60/02* (2013.01); *H04L 67/14* (2013.01); *H04L 67/145* (2013.01); *H04L 69/16* (2013.01); *H04L 69/162* (2013.01); *H04W 80/06* (2013.01)

(58) Field of Classification Search
None
See application file for complete search history.

(56) References Cited

U.S. PATENT DOCUMENTS

| | | | | |
|---|---|---|---|---|
| 5,768,531 | A  * | 6/1998 | Lin ................................ | 709/242 |
| 7,697,934 | B2 * | 4/2010 | Vikberg et al. ............. | 455/435.2 |
| 7,912,004 | B2 * | 3/2011 | Gallagher et al. ............ | 370/329 |
| 7,969,864 | B2 * | 6/2011 | Nylander et al. ............. | 370/216 |
| 2005/0190754 | A1 * | 9/2005 | Golikeri et al. ............... | 370/383 |
| 2006/0029083 | A1 * | 2/2006 | Kettlewell et al. ............ | 370/401 |
| 2006/0209799 | A1 * | 9/2006 | Gallagher et al. ............ | 370/352 |
| 2007/0202891 | A1 * | 8/2007 | Diachina et al. .............. | 455/458 |
| 2008/0025258 | A1 * | 1/2008 | Lefevre et al. ................ | 370/330 |
| 2008/0039086 | A1 * | 2/2008 | Gallagher et al. ......... | 455/435.1 |
| 2008/0070574 | A1 * | 3/2008 | Vikberg et al. ............. | 455/435.2 |

FOREIGN PATENT DOCUMENTS

| | | |
|---|---|---|
| EP | 11707519 A | 6/2001 |
| EP | 1701505 A | 9/2006 |
| WO | 2006136660 A | 12/2006 |

* cited by examiner

*Primary Examiner* — Chi H Pham
*Assistant Examiner* — Soon-Dong D Hyun
(74) *Attorney, Agent, or Firm* — Lerner, David, Littenberg, Krumholz & Mentlik, LLP

(57) ABSTRACT

A wireless communication terminal (100) includes a TCP connection keep-alive timer, and a controller configured to optimize keep-alive timer operation by reducing the frequency with which the terminal transmits keep-alive messages. In one implementation, the controller re-sets the keep-alive timer, before expiration thereof, upon sending or receiving a message at the terminal during a TCP connection, wherein the terminal transmits a TCP connection keep-alive message only upon expiration of the keep-alive timer. The terminal may transmit a register request message indicating whether the terminal supports optimized keep-alive timer operation.

14 Claims, 2 Drawing Sheets

UMA/GAN KEEP-ALIVE MECHANISIM IN WIRELESS COMMUNICATION NETWORKS

FIELD OF THE DISCLOSURE

The present disclosure relates generally to wireless communications, and more particularly to keep-alive message signaling in mobile stations that communicate in Unlicensed Mobile Access Networks (UMA) and General Access Networks (GANs), corresponding entities and methods.

BACKGROUND

The Unlicensed Mobile Access (UMA) and General Access Network (GAN) specifications define keep-alive mechanisms that perform different functions. Generally, the keep-alive mechanism informs the network when a mobile station (MS) has disconnected. This occurs when the network stops receiving periodic keep-alive messages from the MS. After the MS disconnects, the network can eventually release network resources previously linked to the MS and optimise the use of resources in GAN controller (GANC). In addition, when no other message is flowing on the link, the continual sending of periodic keep-alive messages by the MS permits maintaining Transmission Control Protocol (TCP) socket flow.

In paragraph 6.5 of the GAN Specification, when the mobile station (MS) receives a Generic Access Resource Control (GA-RC) Register Accept message, the MS initiates the GA-RC keep-alive mechanism by starting a TU3906 timer using a TU3906 time value received in the message. In one known process, when the TU3906 timer expires in the MS, the MS sends the GA-RC keep-alive message to the GANC and re-starts the TU3906 timer. A consequence of the GAN specification is that upon receipt of the GA-RC Register Accept message, the MS sends a GA-RC Keep-Alive message upon every expiry of the TU3906 timer, without regard for other procedures that may be performed by the MS. For example, if the TU3906 timer expires during a Generic Access Circuit Switched Resources (GA-CSR) signalling procedure, the MS sends a keep-alive during signalling, which is not necessary efficient.

U.S. Publication No. 2008/0025258A1 entitled "UMA/GAN Keep-Alive Mechanism In Wireless Communication Networks" discloses a wireless communication user terminal that re-sets the TU 3906 timer upon transmission of a message thereby preventing expiration of the timer and the unnecessary transmission of keep-alive messages. For example, the TU 3906 timer may be re-set when the user terminal sends a Generic Access Circuit Switched Resource (GA-CSR) message or a Generic Access Packet Switched Resource (GA-PSR) message or some other message on the TCP socket.

The various aspects, features and advantages of the disclosure will become more fully apparent to those having ordinary skill in the art upon careful consideration of the following Detailed Description and the accompanying drawings described below. The drawings may have been simplified for clarity and are not necessarily drawn to scale.

DETAILED DESCRIPTION

Figure 1:
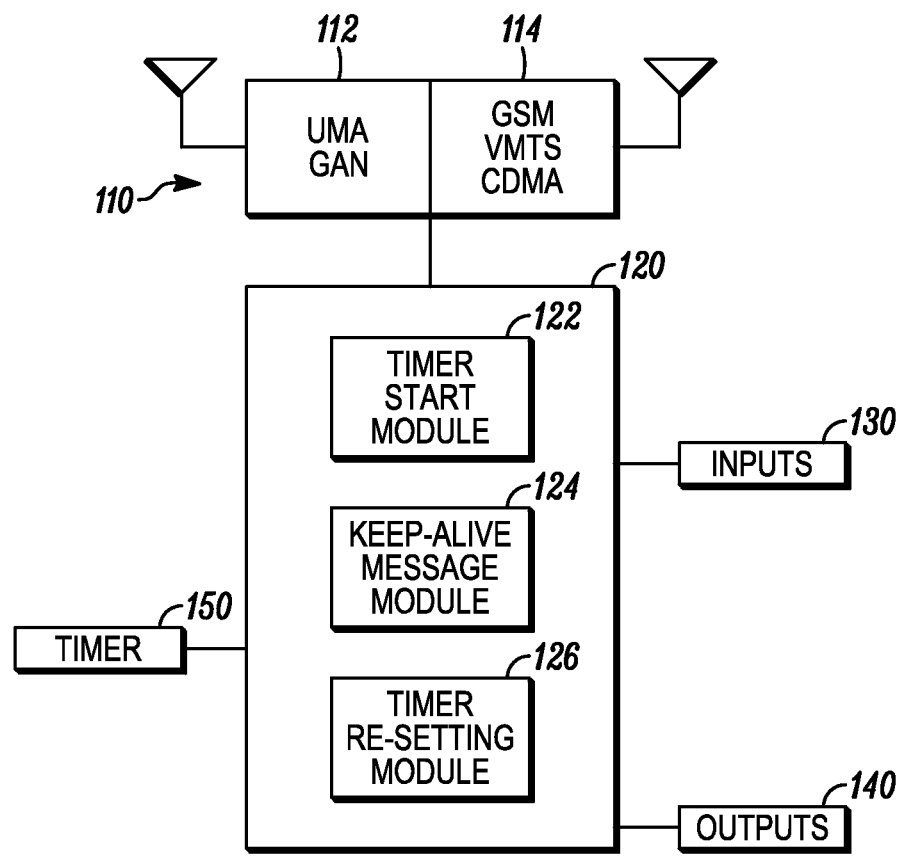
FIG. 1 is a wireless communication device.

In FIG. 1, a wireless communication terminal 100 generally comprises a wireless transceiver 110 communicably coupled to a controller 120. The exemplary transceiver includes an Unlicensed Mobile Access (UMA) and/or General Access Network (GAN) transceiver or some other protocol transceiver 112. Thus the terminal communicates with the UMA and/or GAN over a packet-based connection, for example, a transmission control protocol (TCP) connection or some future packet protocol link.

In some embodiments, the transceiver also includes a cellular transceiver, for example, a GSM, UMTS, CDMA, WiMAX or other existing or future cellular protocol transceiver 114 capable of communicating on a wireless communications network. The terminal may be implemented as a mobile communications handset, for example, a cellular telephone, personal digital assistant (PDA), or other mobile station (MS) or terminal. The terminal may also be implemented as a personal computer including a removable GAN and/or UMA wireless access card or equivalent circuitry.

The controller may comprise a central processing unit (CPU) and/or a digital signal processor (DSP). The controller is communicably coupled to user inputs 130, for example, a keypad or other alphanumeric input devices, a microphone, Bluetooth headset microphone and other inputs suitable for use with such terminals as is well known by those having ordinary skill in the art. The controller is also coupled to user outputs 140, for example, a display and audio device among other outputs. In other embodiments, the inputs and outputs may include other user interfaces.

In FIG. 1, the terminal 100 includes a keep-alive timer 150 that is used to prompt the terminal when to transmit packet-based connection keep-alive messages to a network entity, for example, a GAN and/or UMA controller entity. More particularly, the terminal transmits a keep-alive message upon expiration of the keep-alive timer. The keep-alive timer is re-set and another keep-alive message is transmitted upon expiration of the keep-alive timer. The network entity maintains the packet-based connection in response to receiving the keep-alive message. For example, during a TCP connection, the keep-alive messages maintain TCP socket flow when no data is flowing. When the terminal disconnects from the network, the network stops receiving keep-alive messages whereupon the network releases network resources previously allocated to the terminal. While the keep-alive timer is illustrated as a separate entity in FIG. 2, the timer is typically integrated with the controller and may be implemented as software or firmware executed by the controller. In one embodiment, the keep-alive timer is a TU 3906 timer.

In embodiments where the keep-alive timer is configured to send keep-alive message only upon expiration of the timer, re-setting the timer will prevent expiration thereof and thus reduce the frequency at which the terminal transmits keep-alive messages. Reduced keep-alive signaling reduces radio resource usage and also reduces current drain in terminal. According to one aspect of the disclosure, the keep-alive mechanism is optimized to avoid unnecessary signaling and particularly to reduce the frequency at which the terminal transmits keep-alive messages to the network.

It is generally unnecessary to transmit keep-alive messages to the network when the terminal is receiving and/or transmitting messages with the network. Thus, in one embodiment, the controller is configured to re-set the keep-alive timer, before expiration of the keep-alive timer, upon receipt of a message, from the network, at the wireless transceiver when the wireless communication terminal is in a TCP connection. For example, the timer may be re-set each time the terminal receives a Generic Access Resource Control (GA-RC) message, a Generic Access Circuit Switched Resource (GA-CSR) message or some other network originated message on the TCP socket. The timer may also be re-set upon transmission of a message by the terminal to the network. For example, the timer may be re-set each time the terminal sends a message, for example, a Generic Access Circuit Switched Resource (GA-CSR) message, a Generic Access Resource Control (GA-RC) message, a Generic Access Packet Switched Resource (GA-PSR) message or some other network bound message on the TCP socket.

It is generally only necessary to send keep-alive messages after idle periods during which messages are not transmitted or received. Allowing the keep-alive timer to expire in the absence of inbound or bound messaging at the terminal will ensure that the terminal sends keep-alive messages only after idle periods, thereby maintaining the packet-based connection.

In FIG. 1, the controller 120 includes a timer start module 122 that starts the keep-alive timer 150. The timer start module is typically implemented as software of firmware executed by the controller. In one embodiment, the timer start module starts the keep-alive timer when the terminal connects to or registers with the network. In some implementations, the terminal receives a register accept message including a timer value, which the terminal uses to start the timer. A network entity typically transmits the register accept message to the terminal in response to a register request message sent by the terminal. In GAN, for example, the terminal sends a GA-RC register request message to the GAN controller (GANC), which sends a GA-RC register accept message that includes a TU 3906 timer value. The terminal thus starts or initiates the TU3906 timer using a TU 3906 timer value received in the GA-RC message. Alternatively, the timer value may be hard coded or it may be variable and set based on instructions from the network. In another embodiment, the terminal sets the timer value.

As note above, when the keep-alive timer expires, the terminal sends a keep-alive message to the network controller and re-sets the timer. The network entity maintains the packet-based connection in response to receiving the keep-alive message. For example, A GAN and/or UMA network controller entity maintain TCP socket flow when no data is flowing upon receipt of the keep-alive message from the terminal. When the terminal disconnects from the network, the network stops receiving keep-alive messages whereupon the network releases network resources previously allocated to the terminal. In FIG. 1, the controller 120 includes a keep-alive message module 124 that causes the wireless transceiver 110 to transmit a keep-alive message upon expiration of the keep-alive timer. The keep-alive message module is typically implemented in software or firmware executed by the controller.

Figure 2:
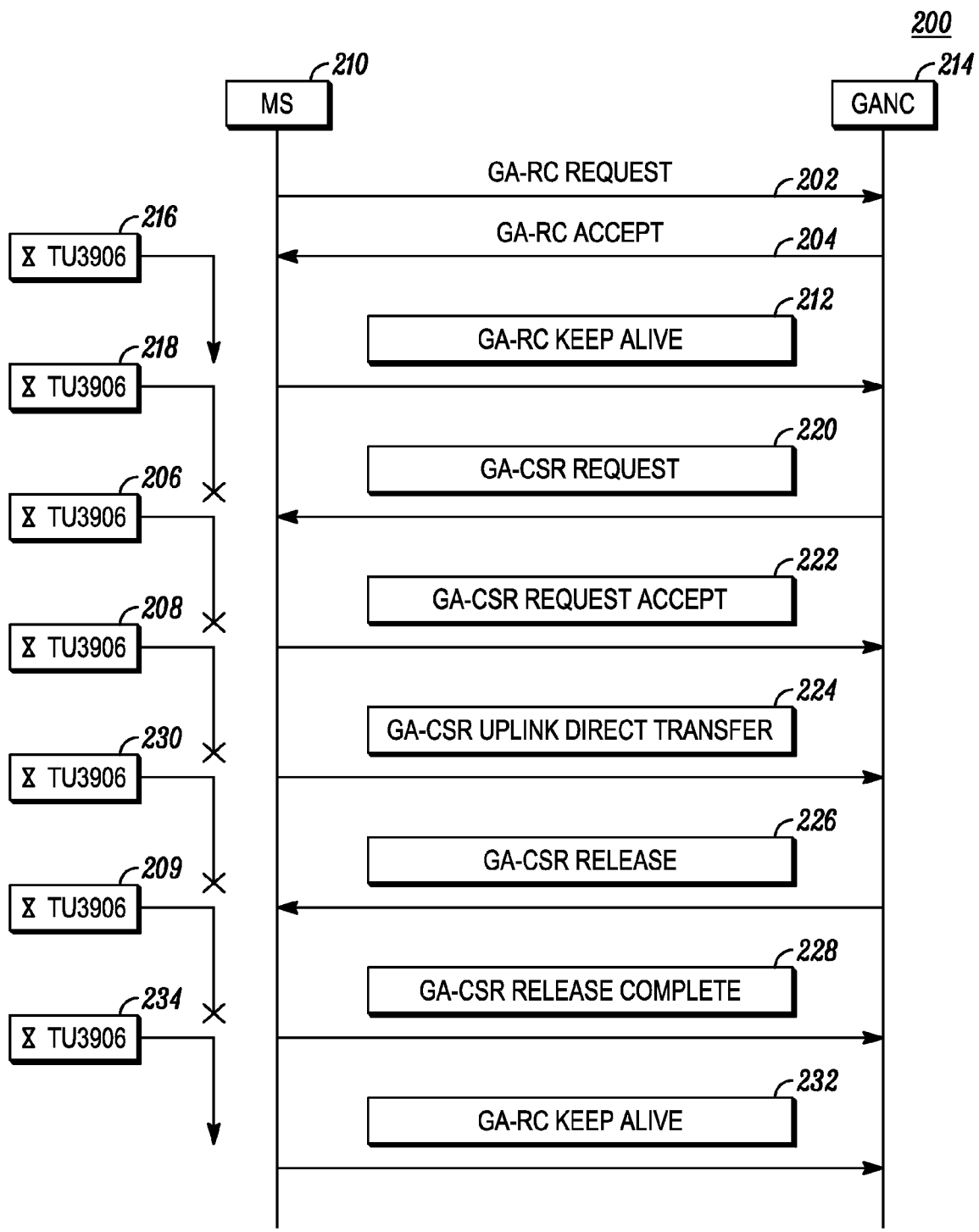
FIG. 2 is a signaling diagram according to an exemplary embodiment of the disclosure.

In FIG. 2, the terminal controller 120 also includes a keep-alive timer re-setting module 126 that re-sets the keep-alive timer 150. The keep-alive timer is generally re-set upon expiration of the timer. In some embodiments, the keep-alive timer is re-set upon transmitting a message from the terminal to the network controller before expiration of the timer. In other embodiments, the keep-alive timer is re-set upon receiving a message at the terminal from the network controller before expiration of the timer. On the network side, a network keep-alive timer is generally re-set when the network sends a TCP packet to the terminal, and when the network receives a packet from the MS. In some embodiments, the keep-alive timer is not reset upon the transmission of messages on the User Datagram Protocol (UDP) link.

In the process flow diagram 200 of FIG. 2, the MS 210 sends a GA-RC Register Request 202 message to the GAN controller (GANC) 214. More generally, the Register Request 202 is some other protocol registration request message. In some implementations, the register request message includes a field indicating whether the MS supports optimized operation of a keep-alive timer that runs during the network connection. In one particular implementation, support for the optimization of the keep-alive mechanism is indicated in the Required GAN Services IE sent in the GA-RC register request message. More generally, however, the support may be indicated in some other portion of the register request.

In FIG. 2, the GANC 214 sends a GA-RC Register Accept 204 message to the MS 210. More generally, the Register Accept message 204 is some other protocol registration accept message. The Register Accept message 204 includes a TU 3906 timer value. The MS 210 initiates the TU 3906 timer 216 using the timer value upon receipt of the Register Accept message. Upon expiration of the TU 3906 timer, the MS 210 sends a GA-RC Keep-Alive Message 212 to the GAN controller (GANC) 214. At 218, the TU 3906 timer is re-set upon its expiration whereupon the terminal transmits another keep-alive message upon the next expiration of the timer.

In FIG. 2, before expiration of TU 3906 timer re-set at 318, the MS 210 sends a GA-CSR Request 220 message to the GANC 214 and resets the TU 3906 timer at 206 before expiration of the timer, thus precluding transmission of another GA-RC Keep-Alive message. The GANC 214 replies to the GA-CSR Request with a GA-CSR Accept 222 message, whereupon the MS 210 re-sets the TU 3906 timer at 208. Thereafter, the MS sends a GA-CSR Uplink Direct Transfer 224 to the GANC 214 and resets the TU 3906 timer at 230. After the transfer, the GANC 314 sends a GA-CSR Release message 226 to the MS 210, which re-sets the TU 3906 timer at 209. The MS 310 then sends a GA-CSR Release Complete message 328 and again re-sets the TU 3906 timer at 234. The MS 210 sends a GA-RC Keep-Alive message 232 upon expiration of the TU3906 timer. Thereafter the time is re-set and the process continues.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a wireless communication user terminal capable of communicating over a packet-based connection with a wireless network controller entity, the method comprising:
   transmitting a register request message,
   the register request message indicating whether the wireless communication user terminal supports optimized operation of a keep-alive mechanism;
   optimizing operation of the keep-alive mechanism by reducing a frequency with which the wireless communication user terminal transmits keep-alive messages during a packet-based connection.

2. The method of claim 1 further comprising
   transmitting a packet-based connection keep-alive message upon expiration of the keep-alive timer,
   reducing the frequency with which keep-alive messages are transmitted by re-setting the keep-alive timer, before expiration of the keep-alive timer, upon transmitting or receiving a message at the wireless communication user terminal.

3. The method of claim 2, transmitting a packet-based connection keep-alive message only upon expiration of the keep-alive timer, without transmitting the packet-based connection keep-alive message upon re-setting the keep-alive timer.

4. The method of claim 2 further comprising:
receiving a register accept message after transmitting the register request message, the register accept message including a keep-alive timer value,
starting the keep-alive timer using the keep-alive timer value received in the register accept message.

5. The method of claim 4, the packet-based connection is a TCP connection, starting the keep-alive timer includes starting a TU 3906 timer.

6. The method of claim 2,
the packet-based connection is a TCP connection, the keep-alive timer is a TU 3906 timer,
transmitting the register request message includes transmitting a Generic Access Resource Control (GA-RC) register request message to the wireless network infrastructure entity,
indicating whether the wireless communication user terminal supports optimized operation of a keep-alive mechanism in a required GAN services IE of the GA-RC register request message,
receiving a GA-RC register accept message after transmitting the GA-RC register request message, the GA-RC register accept message including a TU 3906 timer value,
starting the TU 3906 timer using the TU 3906 timer value.

7. The method of claim 6, transmitting a GA-RC keep-alive message only upon expiration of the TU 3906 timer, without transmitting the GA-RC keep-alive message upon re-setting the TU 3906 timer.

8. A wireless communication terminal comprising:
a wireless transceiver;
a transmission control protocol (TCP) connection keep-alive timer that runs when the wireless communication terminal is in a TCP connection;
a controller communicably coupled to the wireless receiver and the keep-alive timer,
the controller is configured to cause the wireless transceiver to transmit a register request message indicating whether the wireless communication terminal supports an optimized keep-alive mechanism,
the controller is configured to optimize operation of the keep-mechanism by reducing a frequency with which the wireless communication terminal transmits keep-alive messages during a packet-based connection.

9. The terminal of claim 8, the controller is configured to reduce the frequency with which keep-alive messages are transmitted by re-setting the keep-alive timer, before expiration of the keep-alive timer, upon transmission or receipt of a message at the wireless transceiver when the wireless communication terminal is in a TCP connection.

10. The terminal of claim 9, the controller is configured to cause the wireless transceiver to transmit a TCP connection keep-alive message only upon expiration of the keep-alive timer, without transmitting a TCP connection keep-alive message upon re-setting the keep-alive timer.

11. The terminal of claim 9, the controller is configured to start the keep-alive timer using a keep-alive timer value obtained from a register accept message received by the wireless transceiver after transmitting the register request message.

12. The terminal of claim 9,
the keep-alive timer is a TU 3906 timer,
the register request message is a Generic Access Resource Control (GA-RC) register request,
indicating whether the wireless communication terminal supports the optimized keep-alive mechanism in a required GAN services IE of the GA-RC register request message,
the controller is configured to reducing the frequency with which keep-alive messages are transmitted by re-setting the TU 3906 timer, before expiration of the TU 3906 timer, upon receipt of the message by the wireless transceiver when the wireless communication terminal is in a TCP connection.

13. The terminal of claim 12, the controller is configured to cause the wireless transceiver to transmit a GA-RC keep-alive message only upon expiration of the TU 3906 timer, without transmitting a GA-RC keep-alive message upon re-setting the TU 3906 timer.

14. The terminal of claim 12, the controller is configured to start the TU 3906 timer using a TU 3906 timer value obtained from a GA-RC register accept message received by the wireless transceiver after transmitting the GA-RC register request message.

\* \* \* \* \*